United States Patent [19]
Ritter

[11] Patent Number: 5,941,365
[45] Date of Patent: Aug. 24, 1999

[54] AIR ASSISTED COLLATOR

[75] Inventor: Mark A. Ritter, Garland, Tex.

[73] Assignee: Dallas A.C. Horn & Co., Dallas, Tex.

[21] Appl. No.: 08/883,843

[22] Filed: Jun. 27, 1997

[51] Int. Cl.⁶ .................................................. B65G 47/24
[52] U.S. Cl. ...................... 198/380; 198/408; 198/462.2;
198/493; 414/798.5
[58] Field of Search ..................................... 198/380, 408,
198/462.2, 493; 414/794.4, 798.4, 798.5

[56] References Cited

U.S. PATENT DOCUMENTS

| | | | |
|---|---|---|---|
| 4,135,616 | 1/1979 | Pellaton | 198/380 |
| 4,718,534 | 1/1988 | Harper | 198/409 |
| 5,029,694 | 7/1991 | Gomez | 198/408 |
| 5,197,584 | 3/1993 | Powell et al. | 198/380 |
| 5,460,481 | 10/1995 | Prakken | 414/798.5 |

*Primary Examiner*—Jospeh E. Valenza
*Attorney, Agent, or Firm*—Michael A. O'Neil

[57] ABSTRACT

A collator includes a first conveyor having a rotatable drum positioned at its discharge end. The rotatable drum is comprised of a plurality of disks. Two pairs of air nozzles are positioned between the rotating disks of the rotatable drum. A second receiving conveyor is positioned below the discharge end of the first conveyor. Bagged products move along the first conveyor and are discharged over the rotating drum of the first conveyor. As each product bag falls toward the second conveyor, an air blast assists in uprighting the bag. A sensor indicates that the product bag is properly positioned for uprighting by the air blast. A programmable logic controller ("PLC") which controls the operation of the collator in accordance with the size of the product bags.

11 Claims, 15 Drawing Sheets

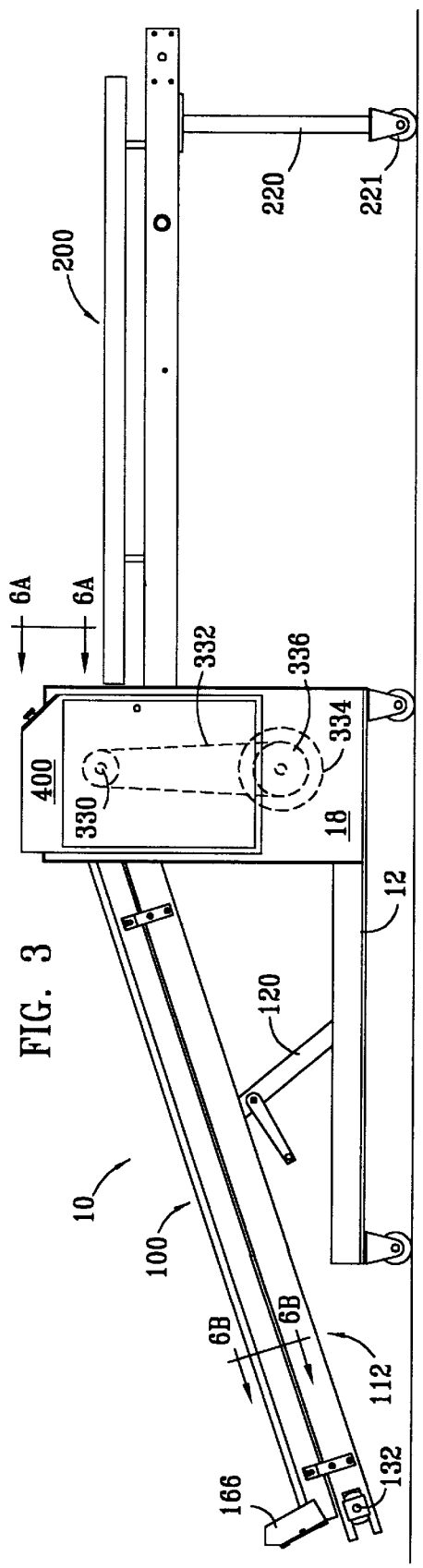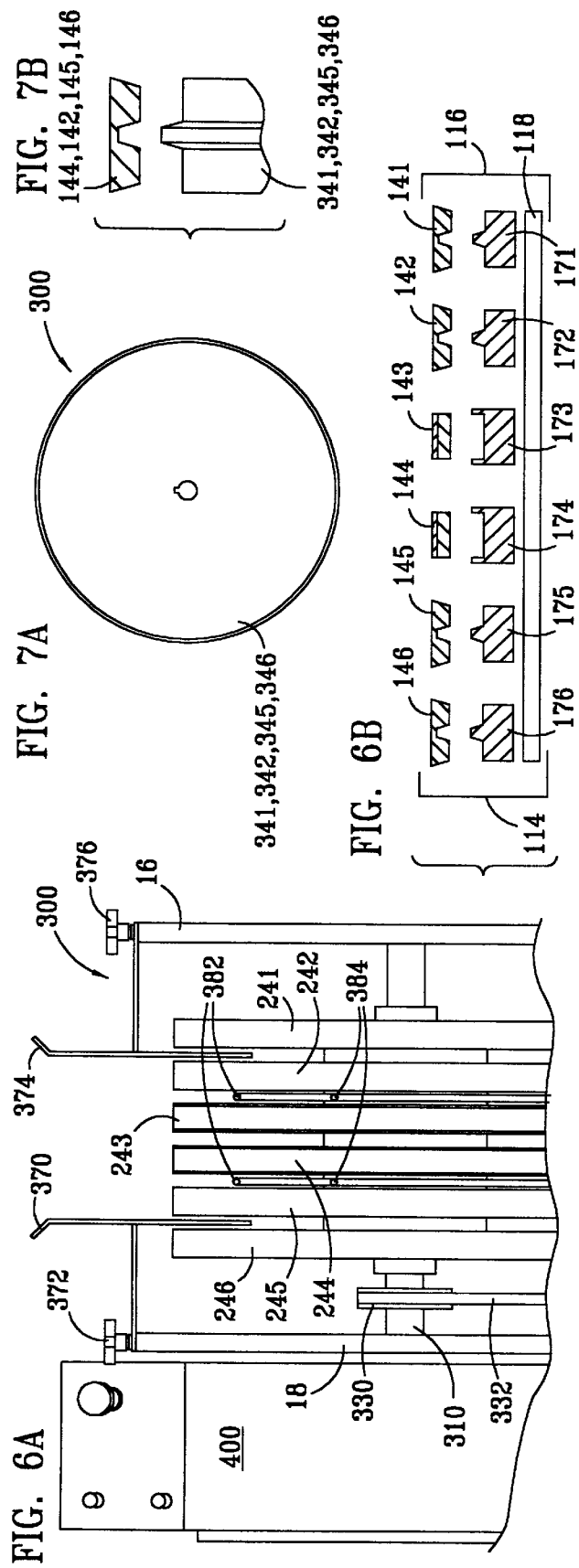

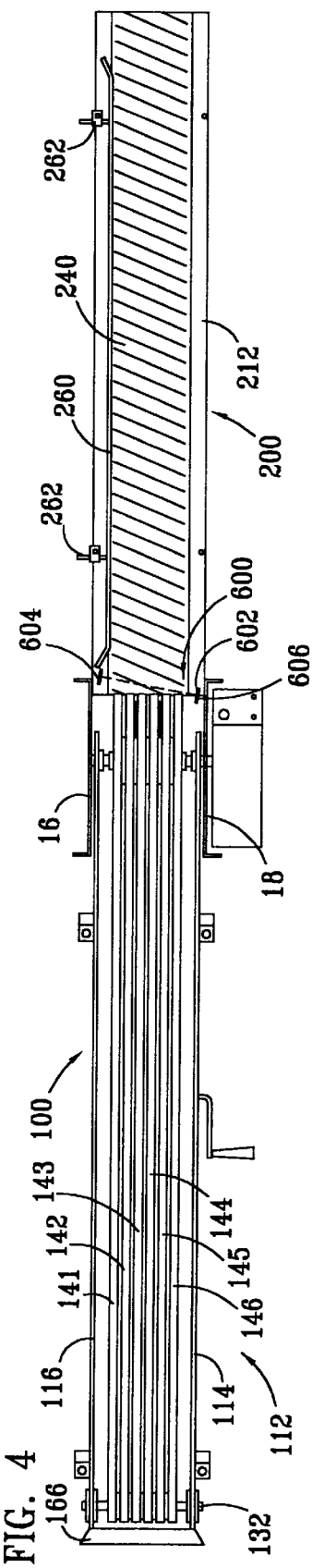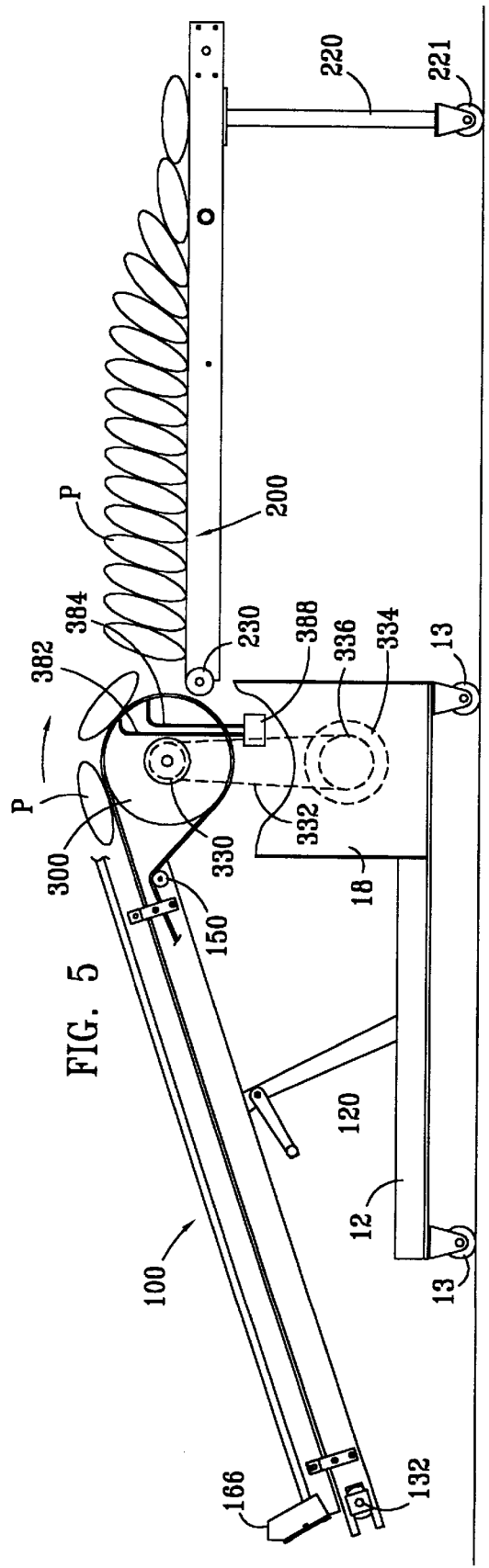

30 PSI

60 PSI

AIR ASSISTED COLLATOR
PROGRAM LISTING
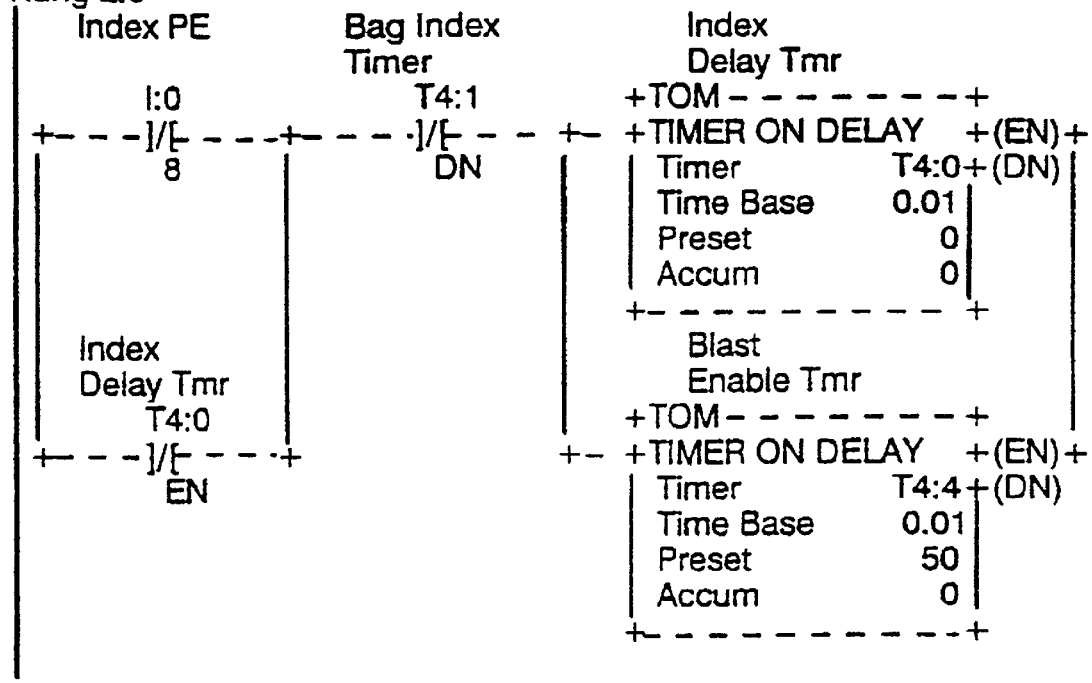
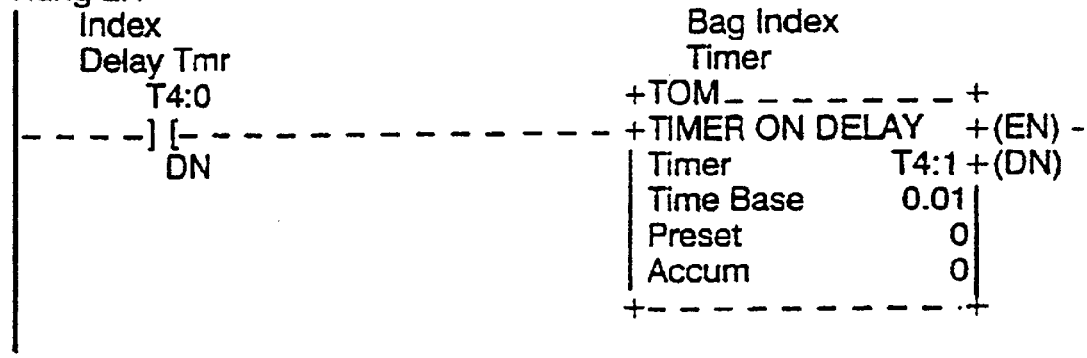
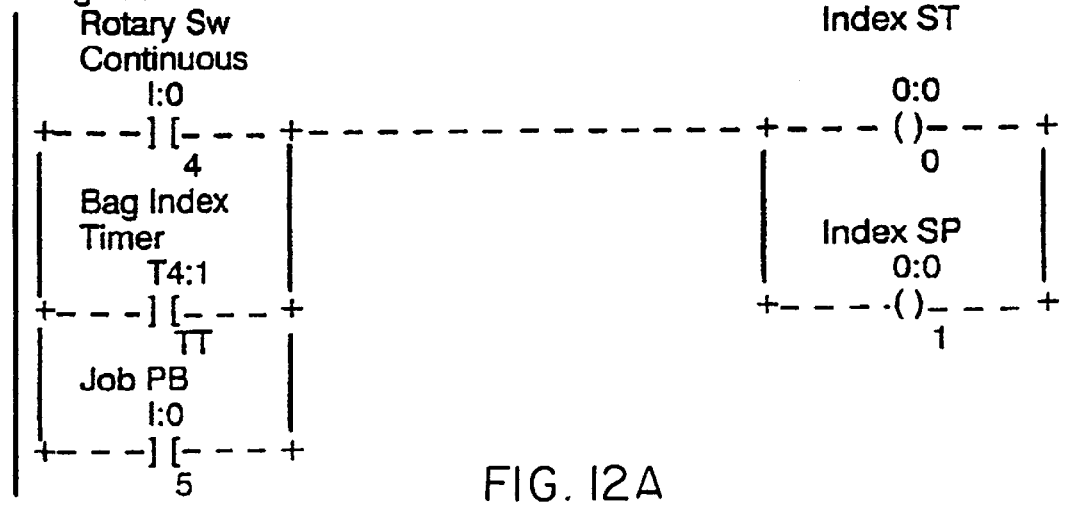
FIG. 12A

AIR ASSISTED COLLATOR PROGRAM LISTING

```
Rung 2:3
   Rotary Sw           Blast                  Small Low
   Small Bag           Enable Tmr             Blast Tmr
   I:0                 T4:4                   +TOM--------+
---] [------+---] [----+---+TIMER ON DELAY  +(EN)-
      0           TT           | Timer         T4:2+(DN)
                               | Time Base     0.01
                               | Preset          20
                               | Accum            0
                               +------------+
                  Small Low
                  Blast Tmr
                  T4:2
              +---] [----+
                  TT Rung 2:4
   Rotary Sw           Blast                  Med. Low
   Med. Bag            Enable Tmr             Blast Tmr
   I:0                 T4:4                   +TOM--------+
---] [------+---] [----+---+TIMER ON DELAY  +(EN)-
      1           TT           | Timer         T4:5+(DN)
                               | Time Base     0.01
                               | Preset          26
                               | Accum            0
                               +------------+
                  Med. Low
                  Blast Tmr
                  T4:5
              +---] [----+
                  TT Rung 2:5
   Rotary Sw           Blast                  Large High
   Large Bag           Enable Tmr             Blast Tmr
   I:0                 T4:4                   +TOM--------+
---] [------+---] [----+---+TIMER ON DELAY  +(EN)-
      2           TT           | Timer         T4:3+(DN)
                               | Time Base     0.01
                               | Preset          30
                               | Accum            0
                               +------------+
                  Large High
                  Blast Tmr
                  T4:3
              +---] [----+
                  TT
```

FIG. 12B

AIR ASSISTED COLLATOR PROGRAM LISTING
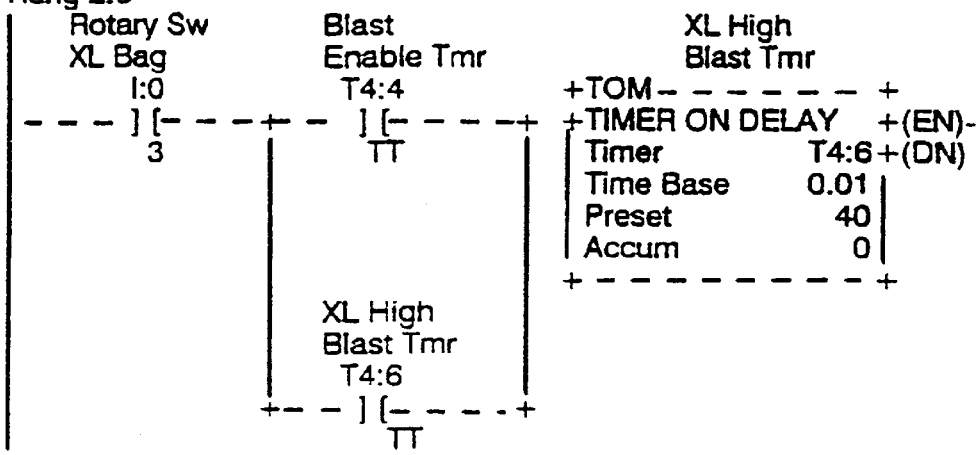
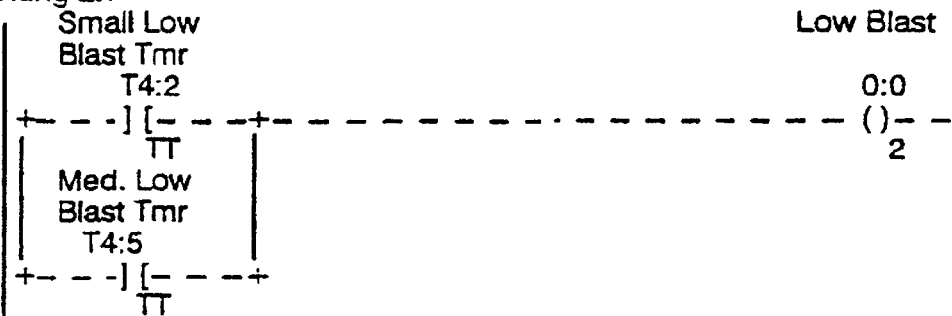
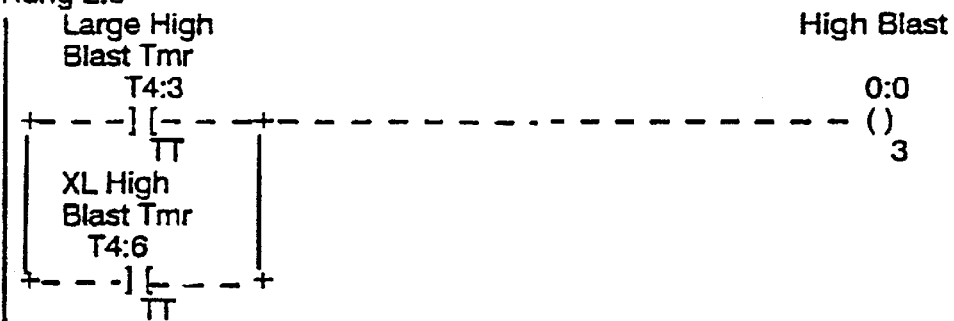
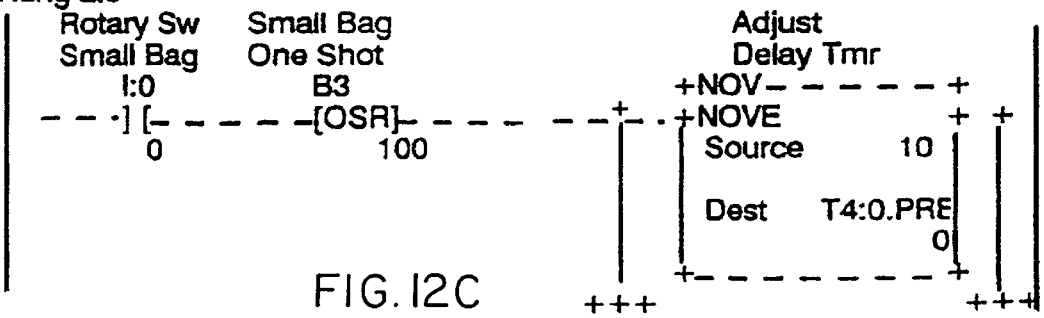
FIG. 12C

AIR ASSISTED COLLATOR PROGRAM LISTING
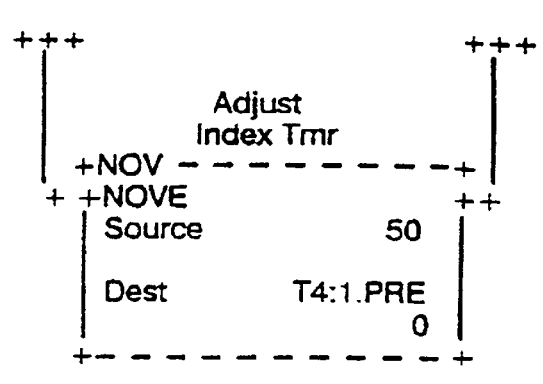
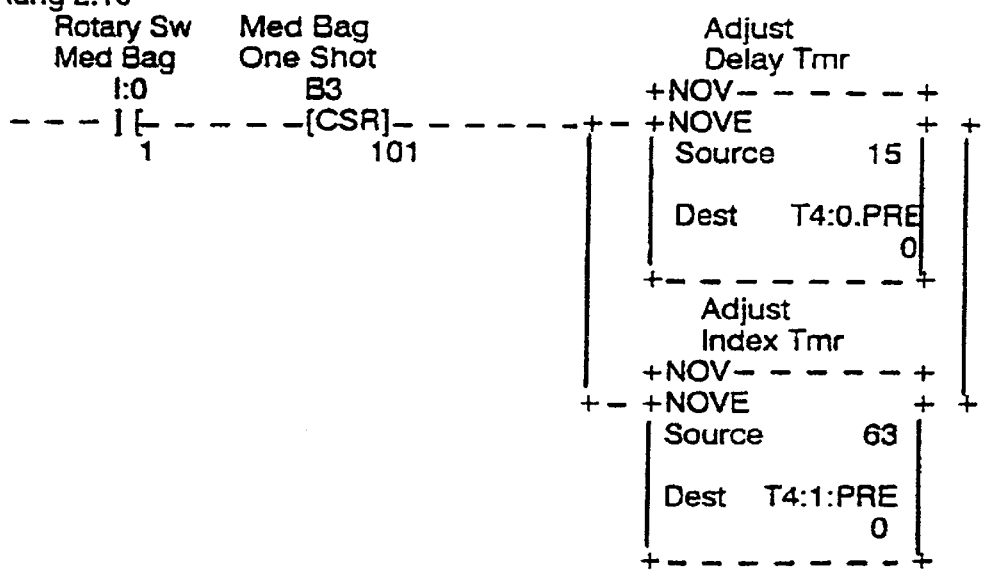
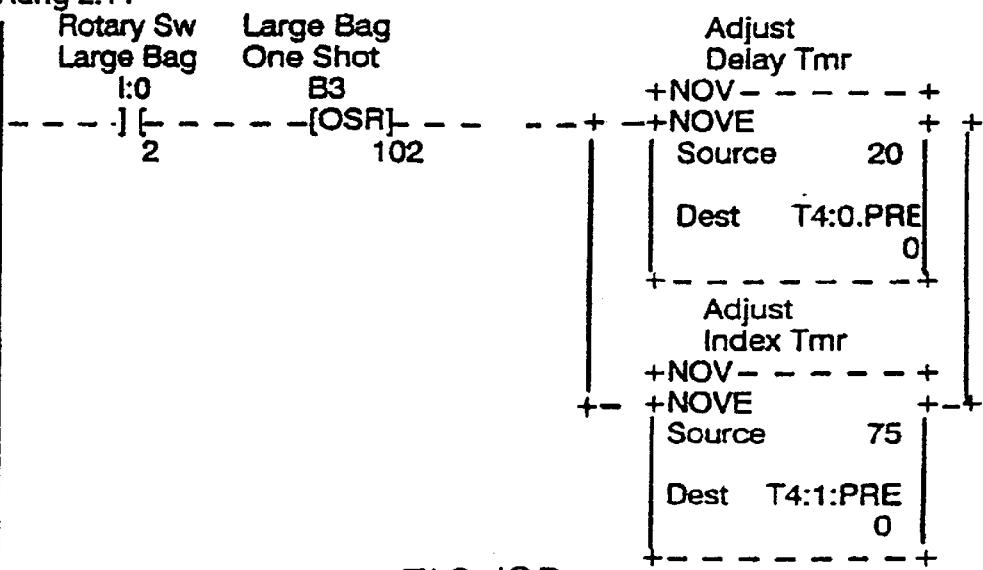
FIG. 12D

AIR ASSISTED COLLATOR PROGRAM LISTING
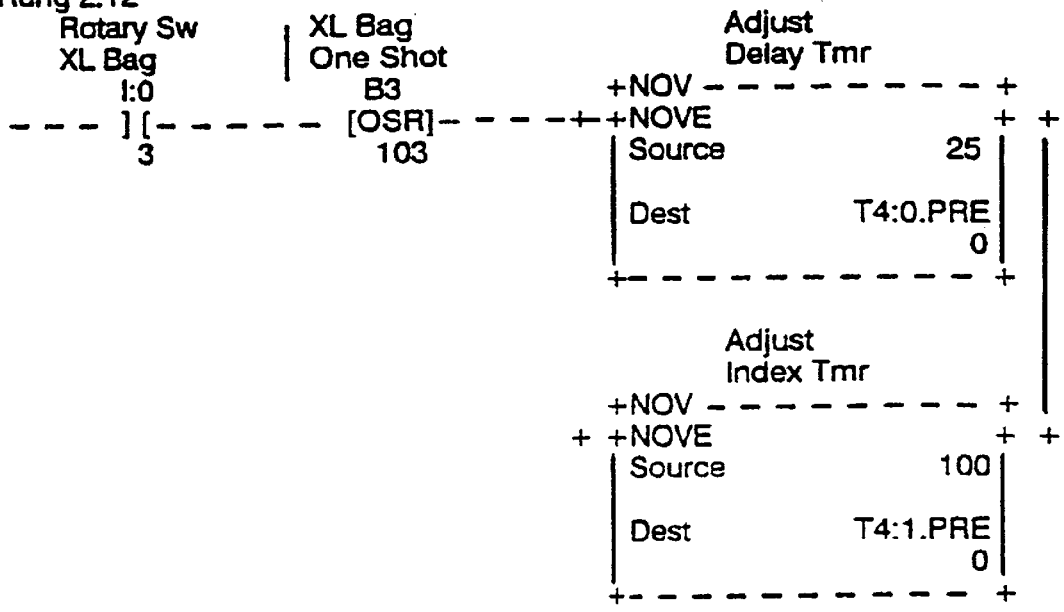
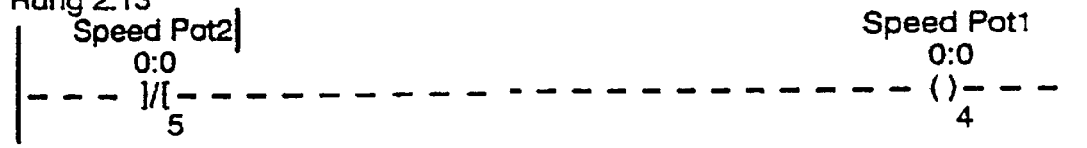
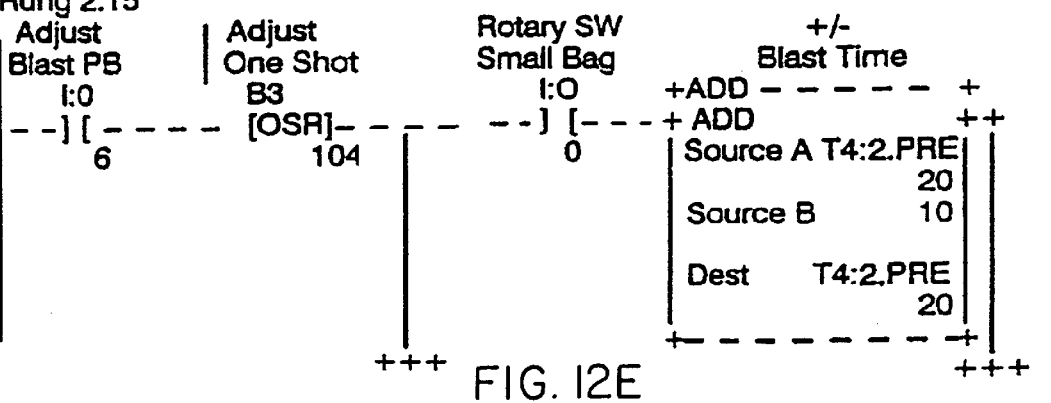
FIG. 12E

AIR ASSISTED COLLATOR PROGRAM LISTING
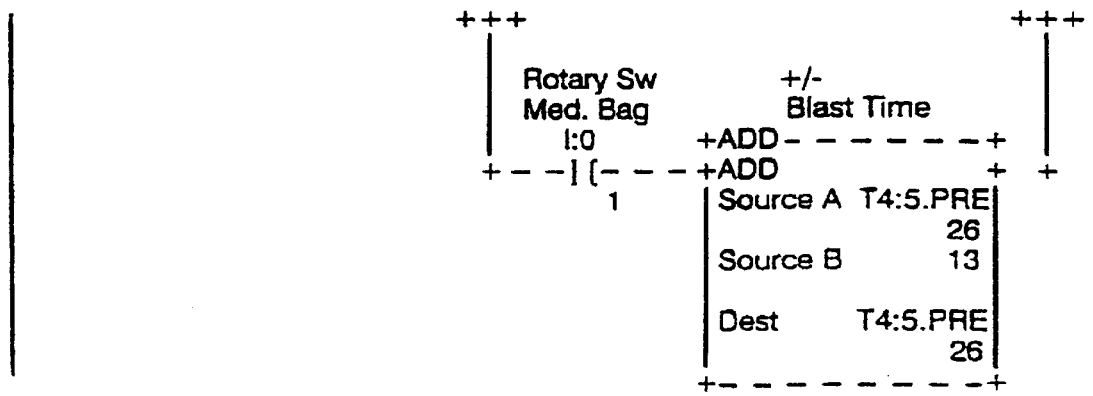
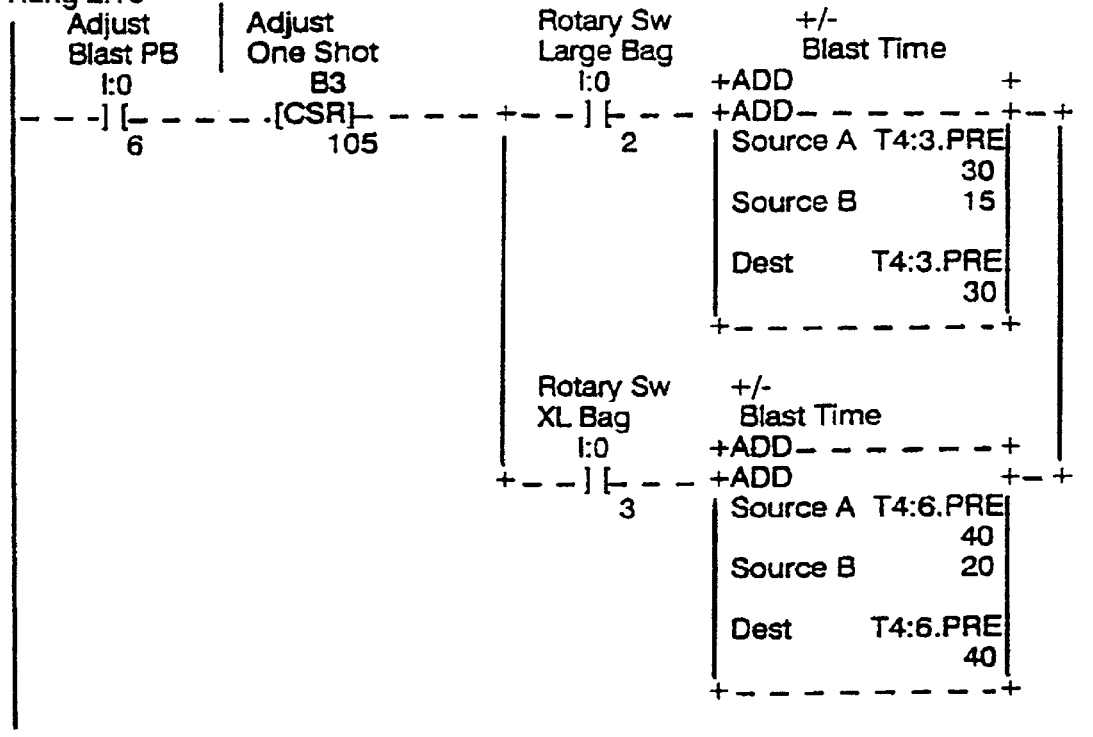
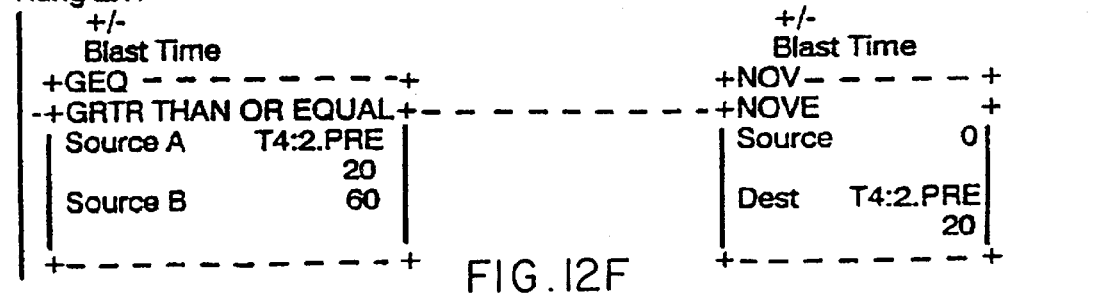
FIG. 12F

AIR ASSISTED COLLATOR PROGRAM LISTING

```
Rung 2:18
     +/-                                  +/-
     Blast Time                           Blast Time
  +GEQ---------+                       +NOV-----+
  +GRTR THAN OR EQUAL+-----+NOVE       +
    Source A    T4:5.PRE              Source          0
                26
    Source B          78              Dest     T4:5.PRE
                                                     26

Rung 2:19
     +/-                                  +/-
     Blast Time                           Blast Time
  +GEQ---------+                       +NOV-----+
 -+GRTR THAN OR EQUAL+-----+NOVE       +
    Source A    T4:3.PRE              Source          0
                30
    Source B          90              Dest     T4:3.PRE
                                                     30

Rung 2:20
     +/-                                  +/-
     Blast Time                           Blast Time
  +GEQ---------+                       +NOV-----+
 -+GRTR THAN OR EQUAL+-----+NOVE       +
    Source A    T4:6.PRE              Source          0
                40
    Source B         120              Dest     T4:6.PRE
                                                     40

Rung 2:21

+------------------+END+-------------+
```

FIG. 12G

AIR ASSISTED COLLATOR

TECHNICAL FIELD

The present invention generally relates to an apparatus for positioning bagged food products on a conveyor and in particular to a conveyor apparatus for collating bagged food products and thereby aiding in the transfer of the bagged food products into shipping cartons.

BACKGROUND AND SUMMARY OF THE INVENTION

Food processing operations typically package products such as potato chips, corn chips, pretzels, etc., in product bags of various sizes ranging from individual serving portions to commercial establishment multiple serving-sized portions. In the art, small bags are typically 4 to 6 inches in height, medium bags 6 to 10 inches in height, large bags 10 to 13 inches in height, and extra large bags 13 to 18 inches in height. The product bags have varying width within each size range depending on the density of the product contained therein. For example, corn chips are more dense than potato chips and pretzels are more dense than corn chips, therefore product bags containing potato chips are wider that those containing corn chips, which in turn are wider than those containing pretzels.

In order to expedite the packaging of individually bagged food products such as potato chips, corn chips, pretzels, etc., into shipping cartons, it is desirable to have the bagged food products in a vertically oriented array. Vertical orienting of bagged food products, known in the art as collating, allows for efficient transition of the bagged food product into shipping cartons. Formerly, the process of gathering the bagged food products from conveyors and transferring them into shipping cartons was a tedious and time consuming labor intensive task. The bagged food products were randomly spaced and horizontally positioned on the conveyor making it difficult to transfer the individually bagged food products from the conveyor into the shipping cartons.

U.S. Pat. No. 4,356,906 issued Nov. 2, 1982 to David M. Fallas, discloses a prior art collator that advanced the art and assisted in gathering and arranging food product bags on a conveyor for transport into shipping cartons. U.S. Pat. Nos. 5,495,932 and 5,615,762, both issued to William B. Dyess and assigned to the Assignee of the present application disclose a conveyor apparatus for collating bag products that uses a bar to engage the packaged food products as they fall from the end of a first inclined conveyor onto a second horizontal conveyor. The bar has a friction enhancing covering surface which aids in pivoting the bagged food products as they fall, thereby properly collating the array of bagged food products. In the aforementioned Dyess collator, the position of the product engaging bar is manually adjustable.

Other prior art collators are known in the industry. One such collator includes a first conveyor having a rotatable discharge drum positioned at the end of an inclined conveyor and comprising a plurality of rotating disks. An air nozzle is adjustably positioned between the rotating disks of the drum. As a bagged food product is discharged over the rotating discharge drum of the inclined conveyor, a blast of air is ejected from the nozzle which strikes the falling product bag and assists in uprighting the bag on a receiving conveyor positioned below the discharge drum of the inclined conveyor. In the prior art collator, the air nozzle must be manually adjusted up or down to properly position the air blast relative to bags of varying product heights. Additionally, the pressure of the air blast must be adjusted manually to take into account the density of the product in the bag.

A need exists for a collator having pre-programmable adjustments based on product bag size and product density thereby eliminating the need for manual adjustment of the collating apparatus. A further need exists for a collating apparatus wherein the operator may adjust the collator while the collator is in operation (i.e., "on the fly") The present invention includes a discharge conveyor having a rotatable drum position at its discharge end. The rotatable drum is comprised of a plurality of disks. Two pairs of air nozzles are positioned between the rotating disks of the rotatable drum. A receiving conveyor is positioned below the discharge end of the first conveyor. Bagged food products move along the discharged conveyor and are discharged over the rotating drum thereof the first conveyor. As each product bag falls toward the receiving conveyor, air blasts assist in uprighting, i.e., collating the product bag. A sensor indicates when the product bag is properly positioned to receive the air blasts for uprighting the bag. The present invention further includes a programmable logic controller ("PLC") which controls the speed and incremental movement of the conveyors, as well as the air pressure and the air blast duration required to effect collating.

BRIEF DESCRIPTION OF THE DRAWINGS

A more complete understanding of the present invention may be had by reference to the following Detailed Description when taken in connection with the accompanying Drawings wherein:

FIG. 3 is a side view of the collator of the present invention;

FIG. 4 is a top view of the collator of FIG. 3;

FIG. 5 is a sectional side view of the collator of FIG. 4 taken along section line 5—5;

FIG. 6A is a partial section view taken along a section 6A—6A of FIGS. 3 and 4, illustrating a discharge drum of the collator of the present invention;

FIG. 6B is a section view taken along a section 6B—6B of FIGS. 3 and 4;

FIG. 7A, 7B, 7C, and 7D are respective side and end views of rotatable disk members of the rotatable discharge drum of FIG. 6;

FIGS. 12A through 12G are a program listing of the control program for the Programmable Logic Controller (PLC) of the collator of the present invention.

DETAILED DESCRIPTION

Figure 1:
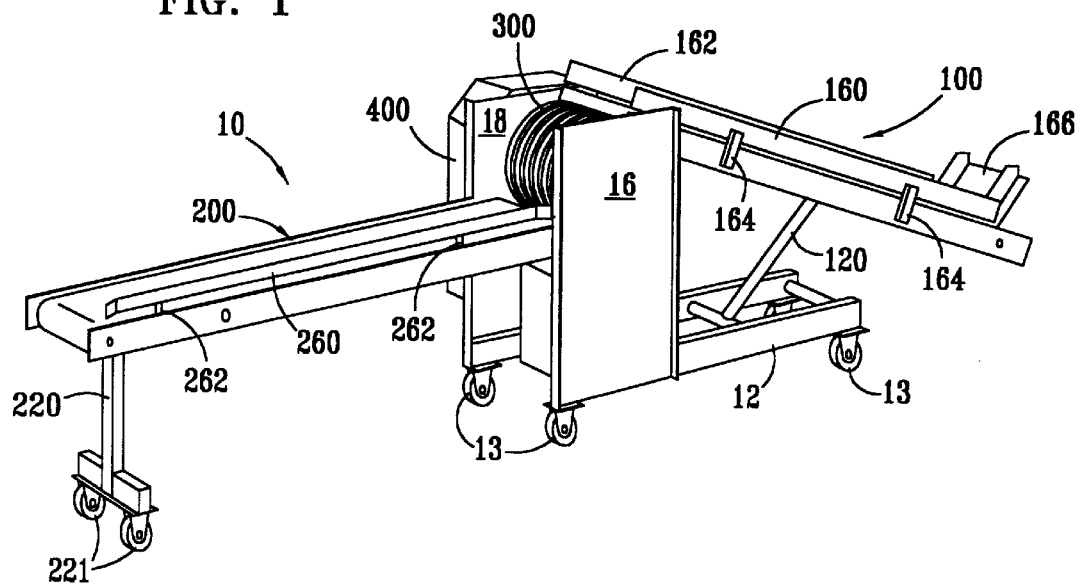
FIG. 1 is a perspective view taken from a discharge end of a collator incorporating the present invention.
Figure 2:
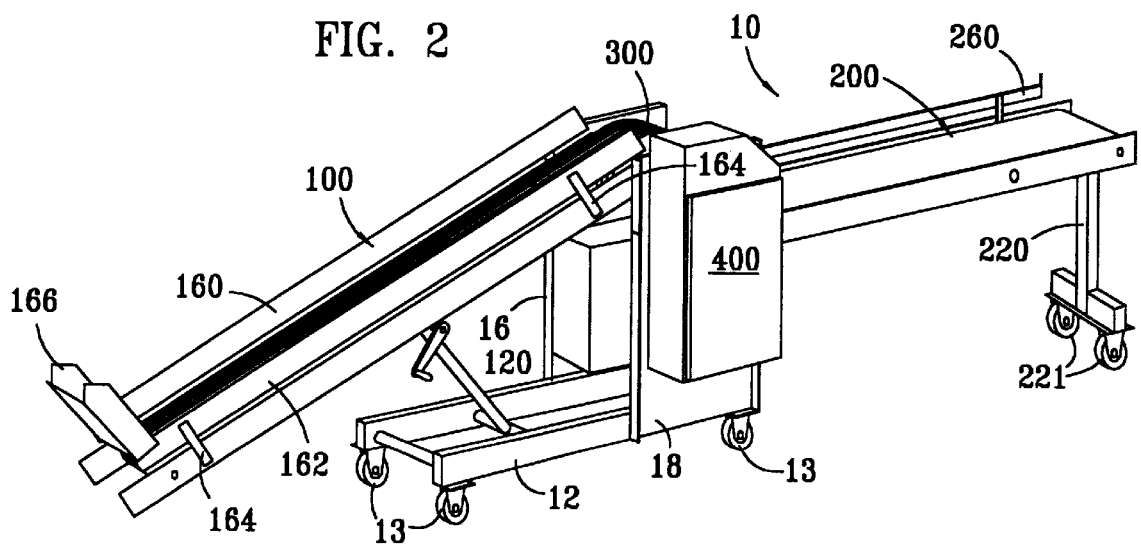
FIG. 2 is a perspective view taken from an input end of the collator of the present invention.

Reference is now made to the Drawings wherein like reference characters denote like or similar parts throughout the Figures. Referring to FIGS. 1 and 2, therein is illustrated an air assisted collator 10 incorporating the present invention. The collator 10 comprises a first conveyor 100 having a rotatable discharge drum 300 disposed at its discharge end, a second conveyor 200 positioned below the discharge end of the first conveyor 100 and a programmable logic controller 400 for controlling the operation of the collator 10.

Referring now to FIGS. 4 and 5, the conveyor 100 comprises a frame 112 supported by an adjustable mount 120 connected to a collator support frame 12. The collator support frame 12 includes a plurality of rollers 13 for mobility and side panels 16 and 18. A first idler roller 132 is adjustably mounted in the frame 112 at the inlet end of the first conveyor 100. A plurality of belts 141, 142, 143, 144, 145 and 146 extend longitudinally on conveyor 100. The two exterior belts on each side, belts 141, 142, 145 and 146, are 31/32 inch wide belts provided by Eagle Belting Co. The two interior belts 143 and 144 are 3/4 inch wide belting provided by MoL Belting. The use of the two interior belts 143 and 144 is advantageous for controlling upward movement of small bags.

As illustrated in FIG. 5, belts 141, 142, 143, 144, 145 and 146 each comprises continuous loop extending over the first idler roller 132, around discharge drum 300, over a second idler roller 150, and back to the idler roller 132. Referring to FIG. 4, the two interior belts 143 and 144 have a surface that includes a friction enhancing coating that provides additional grab between the belts and the product packages carried thereon. As will be understood by those in the art, various types of belting may be used in practice of the present invention. Options include forming all of the belting from the material used in the belts 141, 142, 145 and 146, and forming all of the belting from the material used in belts 143 and 144.

Referring to FIG. 6B, therein is illustrated a cross sectional view of the first conveyor 100. The first conveyor 100 includes two C-shaped side members 114 and 116 that support transverse member 118. Transverse member 118 supports a plurality of longitudinal belt supports 171, 172, 173, 174, 175 and 176 each supporting a respective conveyor belt 141, 142, 143, 144, 145, and 146. The present invention includes an improvement over conveyors of prior art collators in that the longitudinal support members 171–176 have top profiles complimentary to the bottom profile of the respective belts 141–146, thereby supporting and stabilizing the belts.

As illustrated in FIG. 2, the first conveyor 100 further includes two bagged product guide rails 160 and 162 that are adjustably mounted on frame 112 by mounting brackets 164. A feed chute 166 is attached to frame 112. The proximal ends of guide rail 160 and 162 terminate at the discharge drum 300.

FIGS. 4 and 5 illustrate the second conveyor 200. The second conveyor 200 includes a frame 212 supported by an adjustable leg 220 attached at the distal end of the conveyor 200. The leg 220 includes at least two rollers 221 for mobility. A drive roller 230 is positioned at the receiving end of the second conveyor 200 and is driven by a DC drive motor (not shown). A single belt 240 extends longitudinally on the second conveyor 200. The belt 240 is preferably a 10 1/4 inch wide belt manufactured by Thermoid Industries under the trademark Grip-Tex, although other belts may also be used. The belt 240 is configured in a continuous loop positioned around the drive roller 230 and an idler roller located at the distal end of the conveyor 200 (not shown). The second conveyor 200 further includes an adjustable bagged product guide rail 260. The rail 260 is adjustably mounted on the conveyor frame 212 by mounting brackets 262.

Figure 7C:
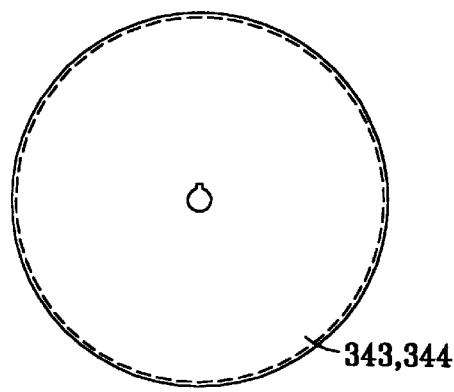
Figure 7D:
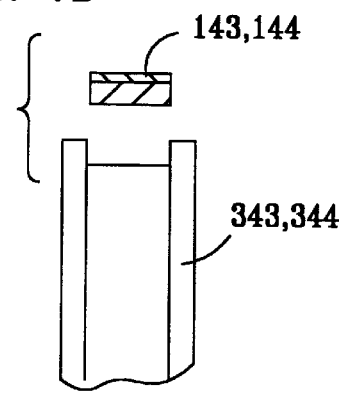

Turning now to FIG. 6A, the rotatable discharge drum 300 is positioned at the discharge end of the first conveyor 100. The rotatable discharge drum 300 is comprised of a shaft 310 having a plurality of disks 341, 342, 343, 344, 345 and 346 mounted thereon by means of a key and keyway (see FIG. 7A and 7C). Each disk respectively receives one of the belts 141, 142, 143, 144, 145 an 146. As heretofore discussed, the two interior belts 143 and 144 have a surface that includes a friction enhancing coating that provides additional grab between the belts and the product packages carried thereon. As illustrated in FIGS. 7B and 7D, the two interior belts 143 and 144 also have a different cross sectional profile from belts 141, 142 and 145 and 146. Therefore, disks 343 and 344 have a correspondingly different profile for receiving belts 143 and 144 (FIGS. 7C and 7D). Disks 341, 342, 345 and 346 receive belts 141, 142, 145 and 146 respectively (FIGS. 7A and 7B).

As illustrated in FIGS. 3, 5 and 6A, the shaft 310 of rotatable drum 300 includes a pulley 330 that receives drive belt 332. The rotatable drum 300 is driven by a continuous speed AC drive motor 334 mounted to side panel 18, acting through a motor pulley 336 and the drive belt 332.

Referring again to FIG. 6A, product guide plate 370 is adjustably mounted to side panel 18 by fastener 372 and product guide plate 374 is adjustably mounted to side panel 16 by fastener 376. The product guide plates 370 and 374 are adjusted transverse to the direction of movement of the belts depending on the product bag width and desired position of the product bag on the drum 300.

Figure 5A:
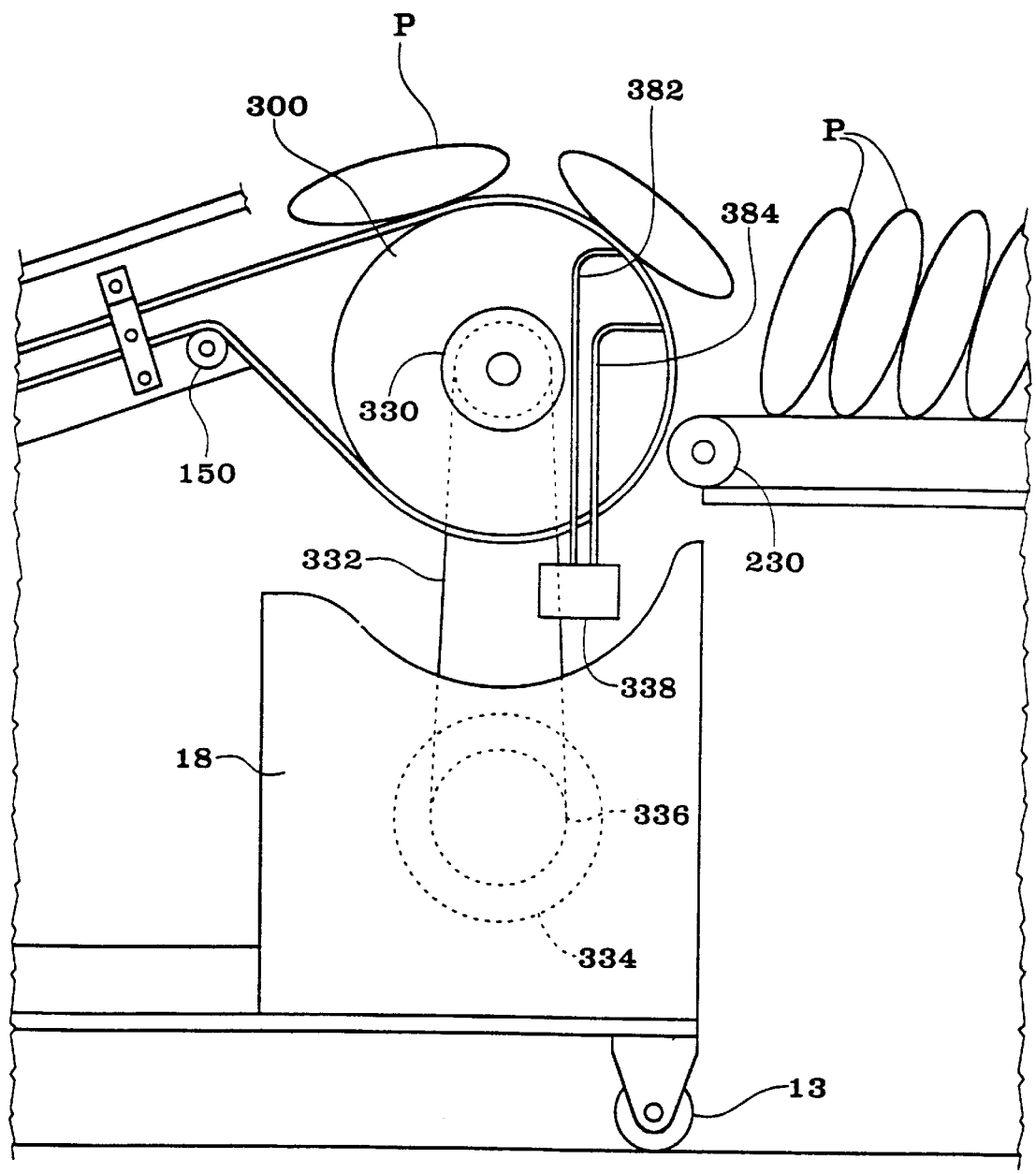
FIG. 5A is an enlargement of a portion of FIG. 5.
Figure 8A:
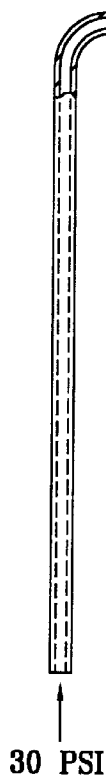
FIGS. 8A and 8B are side views of an air discharge nozzle of the present invention.
Figure 8B:
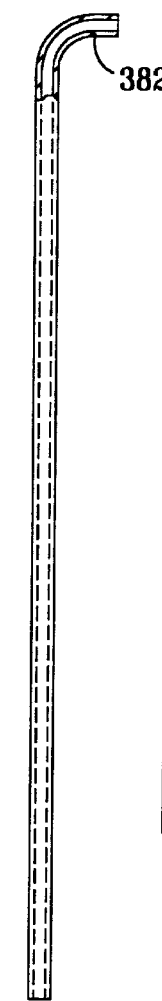

Referring to FIGS. 5A and 6, therein is illustrated an upper pair of air nozzles 382 and a lower pair of air nozzles 384 positioned between the rotating disks 342, 343, 344 and 345 of drum 200. Nozzles 382 and 384 are connected to a conventional compressed air source 388. It will be understood by those skilled in the art that any non-corrosive pressurized gas may be used in the practice of the invention. The upper air nozzles 382 are positioned to discharge an air blast that will strike large and extra large size product bags p having heights ranging from 10 to 18 inches. The lower nozzles 384 are positioned to discharge an air blast that will strike small and medium product bags having a height of 4 to 10 inches. The upper nozzles discharge air at 60 psi (FIG. 8A) and the lower nozzles discharge air at 30 psi (FIG. 8B) because the weight of the larger product bags requires more thrust in order to tip the bags received by the second conveyor 200 to a desired 70 degree angle from horizontal.

A sensor 600 indicates when the product bag p is properly positioned to receive the air blast for uprighting the product bag. The sensor 600 includes a light beam source 602 positioned on a first side of the second conveyor, a reflector 604 positioned across from the light source on the second side of the second conveyor and a light beam receiver 606 positioned on the first side of the second conveyor 300. A falling product bag p interrupts the light beam and generates a signal indicating the presence of the product bag. It will be understood that any type of sensor capable of indication of the position of the product bag may be used in the practice of the invention. As is clearly shown in FIG. 4, the light path between the source, the reflector, and the receiver is angular, which allows detection of all bag sizes without adjustment.

Figure 9:
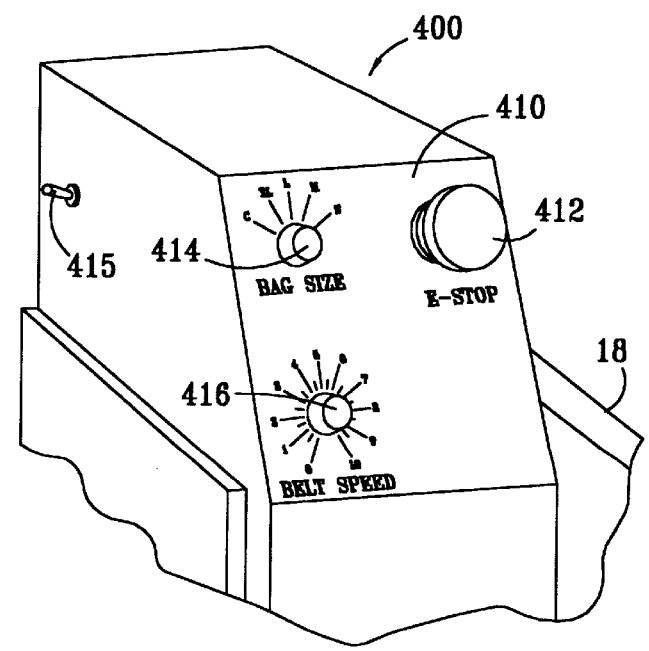
FIG. 9 is a perspective view of the control panel of the programmable logic controller for the collator of the present invention.

Turning now to FIG. 9, therein is illustrated a control panel 410 for the programmable logic controller ("PLC") 400. The panel 410 is provided with an emergency stop switch 412, a variable bag size switch 414, and a variable belt speed switch 416. The bag size switch 414 includes predetermined settings for small, medium, large, extra large, and continuous feed operation. The belt speed switch 416 controls the speed at which the belt 240 on the second conveyor 200 moves when it is activated.

In operation, an operator selects a product bag size setting depending on the height of the product bag. As previously discussed, small bags are typically 4 to 6 inches in height, medium bags are 6 to 10 inches in height, large bags are 10 to 13 inches in height, and extra large and commercial bags are 13 to 18 inches in height. The bag size selector switch 414 signals the PLC to select either the lower or upper nozzles to discharge air when the nozzles are activated. The bag size switch 414 also signals the PLC 400 to select from a pre-programmed set of second conveyor indexing distances. As previously described, the belt 240 of the second conveyor 200 is driven by a DC motor. The DC motor is activated by the PLC 400 for predetermined milliseconds in order for the belt 240 to travel a predetermined distance. The predetermined activation time is set to move the belt 240 (at a preselected speed) approximately 2 inches for a small bag, 3 inches for a medium bag, 4 inches for a large bag, and 5 to 6 inches for an extra large or commercial bag.

The belt speed switch 416 signals the PLC 400 to direct the speed at which the DC motor is run during the milliseconds it is activated. Product density determines the speed at which the belt 240 should run. As previously discussed, denser product packages have narrower bag widths. Therefore in order to achieve proper collation, the belt 240 is driven at a faster speed (generating more incremental distance of travel during the interval of activation) for product packages having greater widths. For example, potato chips require the belt 240 to be run faster than for the more dense and narrower product package containing corn chips.

During operation, the PLC 400 receives a signal from the sensor 600 which indicates when a bag has been received on the second conveyor 200 and is in the proper position to receive an air blast to tip the bag forward. Different products require different air blast durations: small ¼ second; medium ½ second; large ½ second; extra large ¾ second. Toggle switch 415 shown in FIG. 9 increases the air blast duration by ¼ second.

Operation of the collator of the present invention begins with inputting bag size and belt speed data by means of the switches 414 and 416 of FIG. 9. Thereafter, whenever the sensor detects a bag the PLC 400 causes an air blast of proper pressure and duration to be emitted either from nozzle 382 and 384, whereby the bag is collated. If necessary, air blast duration is adjusted by means of the toggle switch 415.

Figure 10:
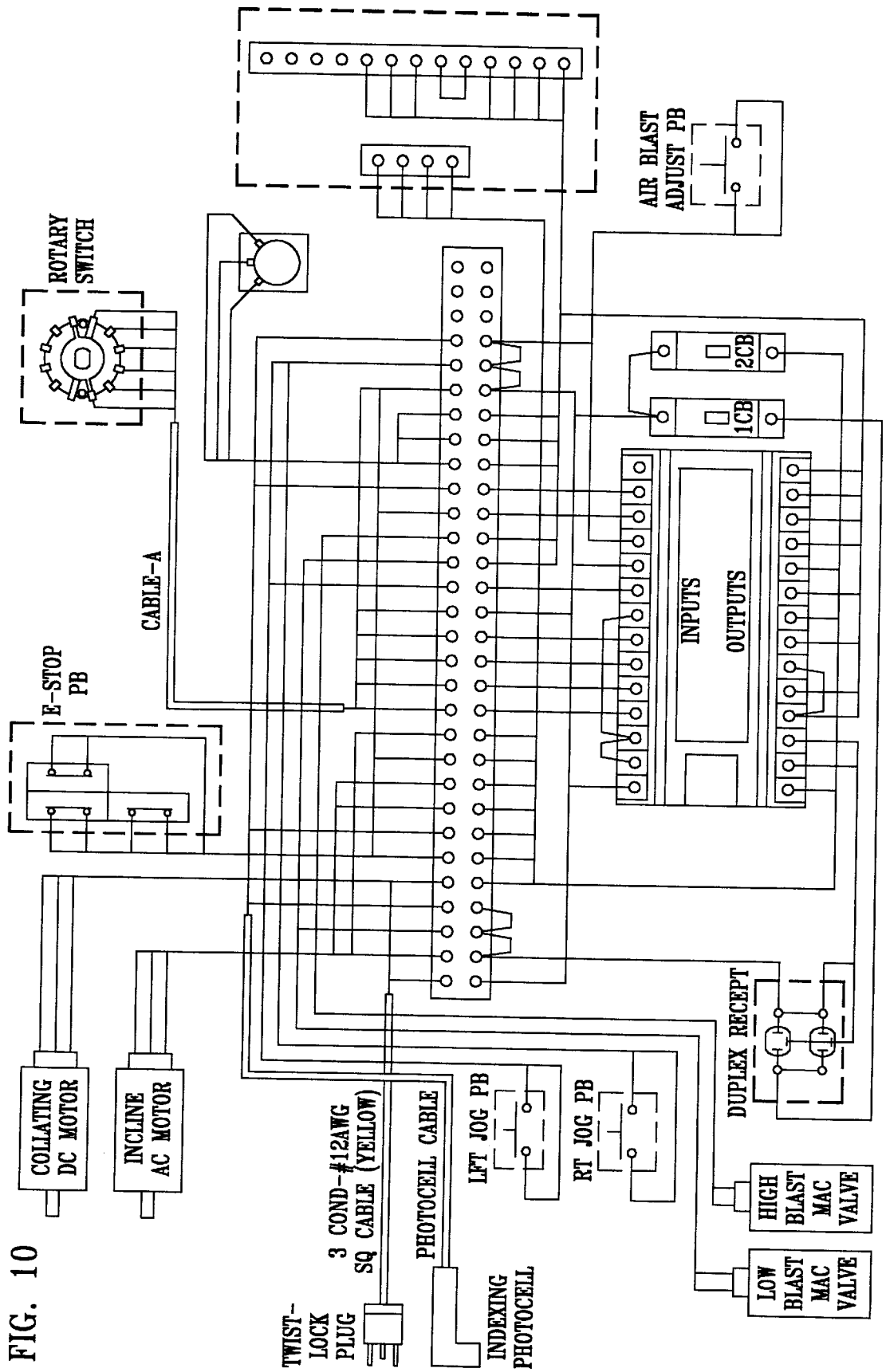
FIG. 10 is a wiring diagram for the collator of the present invention.
Figure 11A:
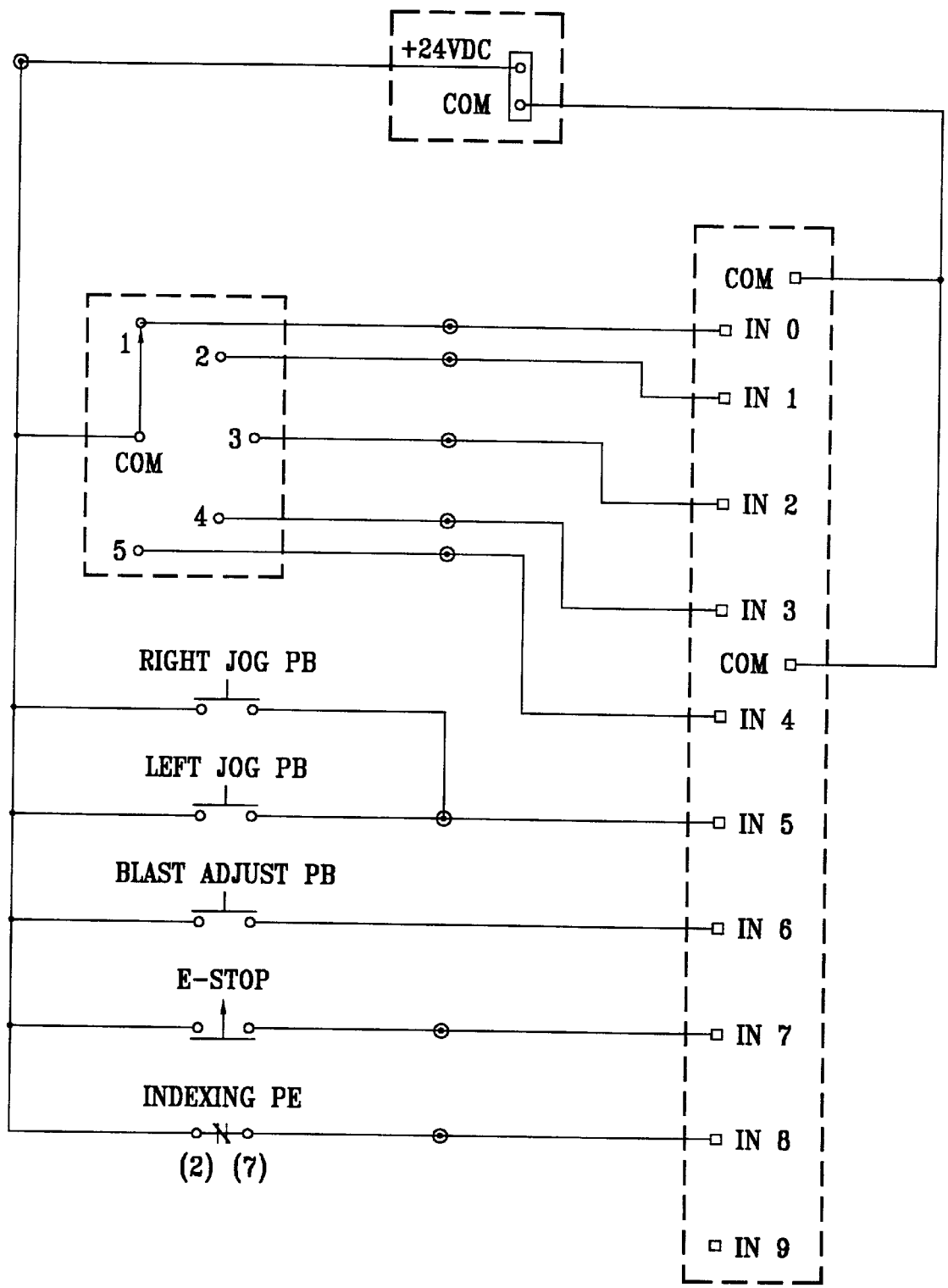
FIG. 11A is a DC wiring schematic for the collator of the present invention.
Figure 11B:
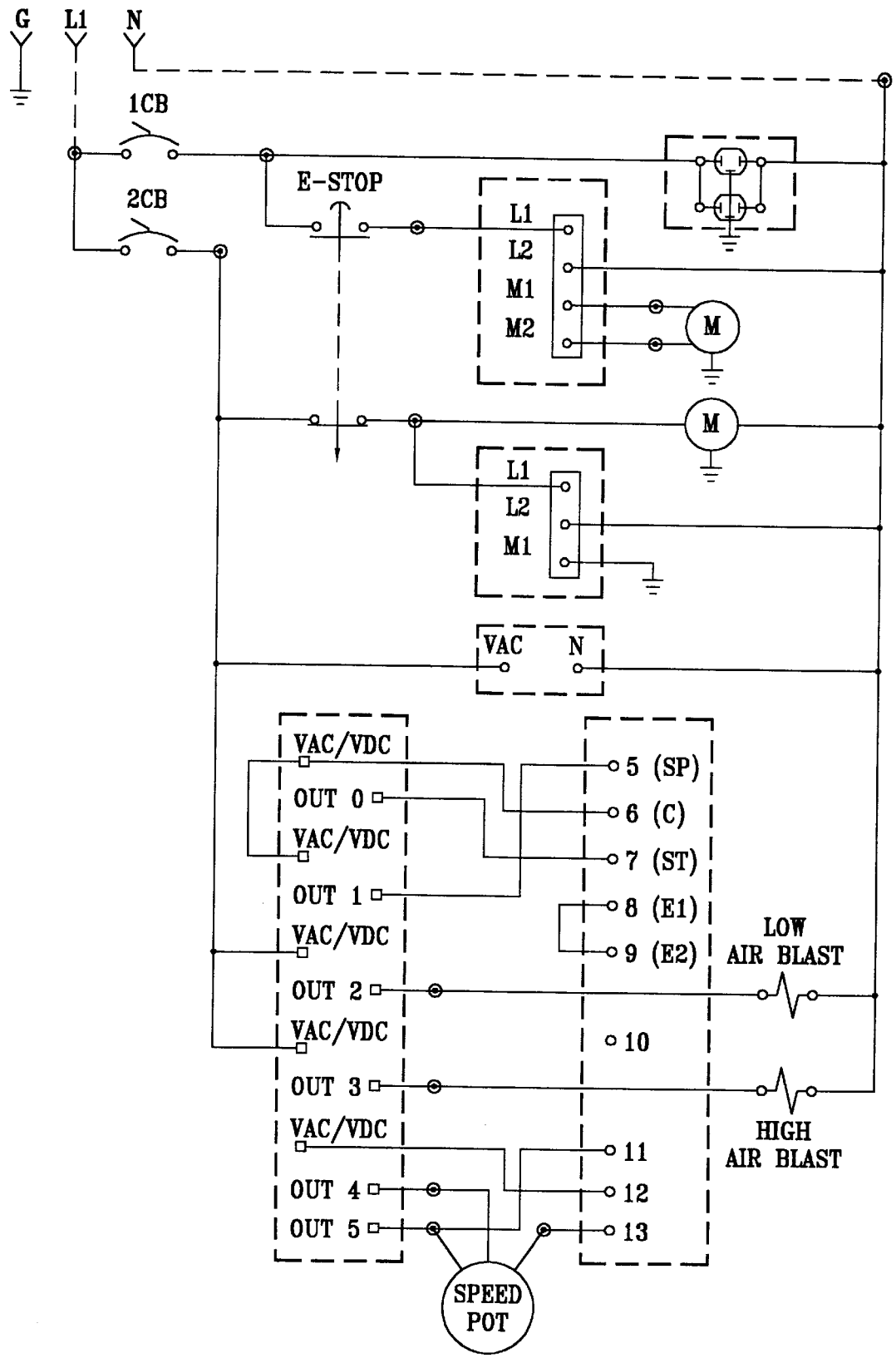
FIG. 11B is a AC wiring schematic for the collator of the present invention.

Referring now to FIGS. 10, 11A and 11B, the electrical wiring for the present invention is illustrated. FIGS. 12A to 12G comprise the program listing for the Programmable Logic Controller (PLC) 400 of the present invention.

Although a preferred embodiment of the present invention has been illustrated in the accompanying Drawings and described in the foregoing Detailed Description, it will be understood that the invention is not limited to the embodiments disclosed but is capable of numerous rearrangements, modifications and substitutions of parts and elements without departing from the spirit of the invention.

I claim:

1. A collator comprising:
    a first conveyor having a discharge end from which bagged food products are dropped, said first conveyor including:
        a frame,
        a plurality of longitudinally movable belts supported by said frame,
        a rotatable drum disposed at the discharge end of the first conveyor, said drum having:
            a plurality of disks fixably connected to a central shaft wherein the disks rotate together, each of said disks receiving at least one of the longitudinally movable belts, and
            at least one air nozzle disposed between said disks, said nozzle connected to a source of pressurized air;
    a second conveyor disposed beneath the discharge end of the first conveyor for receiving the dropped bagged food products;
    a bag position sensor; and
    a controller for receiving bag size data and for receiving a bag position signal from the sensor, processing said signal, and generating an air blast signal; and
    means responsive to the air blast signal for discharging a predetermined blast of air through the nozzle, thereby collating the dropped bag.

2. A collator comprising:
    a first conveyor having a discharge end from which bagged food products are dropped, said first conveyor including:
        a frame,
        a plurality of longitudinally movable belts supported by said frame,
        a rotatable drum disposed at the discharge end of the first conveyor said drum having:
            a plurality of disks fixably connected to a central shaft wherein the disks rotate together, each of said disks each receiving at least one of the longitudinally movable belts, and
            an upper pair of air nozzles disposed between pairs of said disks, each of said upper nozzles connected to a source of pressurized air;
            a lower pair of air nozzles disposed between pairs of said disks, each of said lower nozzles connected to a source of pressurized air,
    a second conveyor disposed beneath the discharge end of the first conveyor for receiving the dropped bagged food products;
    a bag position sensor; and
    a controller for receiving bag size data and for receiving a bag position signal from the sensor, processing said signal, and for generating an air blast signal; and
    means responsive to the air blast signal for discharging pressurized air via at least one pair of air nozzles.

3. The collator of claim 2 wherein the sensor includes a light beam source positioned on a first side of the second conveyor, a reflector positioned across from the second side of the second conveyor and a light beam receiver positioned on the first side of the second conveyor, wherein a falling product bag interrupts the light beam and generates a signal indicating the presence of the product bag.

4. The collator of claim 3 further including a first valve means connected to the upper set of air nozzles; and
    second valve means connected to the lower set of air nozzles,
    wherein the air discharging means activates either the first valve means or second valve means thereby providing air to the upper or lower set of nozzles.

5. The collator of claim 4 further including:

an operator control panel having a first control switch for generating a signal for processing by the controller whereby the controller activates either the first valve means or second valve means thereby providing pressurized air to the upper or lower set of nozzles.

6. The collator of claim 2 wherein the controller generates a signal activating a drive motor and drive roller for moving a belt on the second conveyor forward a predetermined increment.

7. The collator of claim 3 wherein the controller adjusts the speed of the drive motor for the second conveyor.

8. The collator of claim 2 further including a plurality of longitudinal supports positioned below each of the longitudinal belts of the first conveyor.

9. The collator of claim 8 wherein the top profile of each longitudinal support mates the bottom profile of the longitudinal belt it supports.

10. A collator for bagged products comprising:

a conveyor for dropping bagged products from the discharge end thereof;

upper and lower air discharge nozzles positioned to direct air blasts at bagged products dropped from the conveyor;

means for selecting either the upper or the lower air discharge nozzle depending on the size of the bagged product;

means for sensing the positions of bagged products relative to the conveyor; and a controller responsive to the sensing means for discharging an air blast through the selected nozzle.

11. The collator according to claim 10 further including means for inputting bag size data to the controller, and wherein the controller controls the duration of the air blast depending on bag size.

* * * * *

UNITED STATES PATENT AND TRADEMARK OFFICE
CERTIFICATE OF CORRECTION

PATENT NO. : 5,941,365
DATED : August 24, 1999
INVENTOR(S) : Mark A. Ritter

It is certified that error appears in the above-identified patent and that said Letters Patent is hereby corrected as shown below:

Col. 1, line 24, replace "that" with --than--.

Col. 2, line 9, add a "." after "fly")".

Col. 2, line 9, make a new paragraph beginning with "The present".

Col. 2, line 16, delete the words "the first conveyor."

Col. 3, line 23, add "a" before "continuous."

Col. 4, line 10, replace "an" with --and--.

Col. 4, line 20, add a "," after "146."

Col. 4, line 37, replace "drum 200" with --drum 300--.

Col. 4, line 57, replace "second conveyor 300" with --second conveyor 200--.

UNITED STATES PATENT AND TRADEMARK OFFICE
CERTIFICATE OF CORRECTION

PATENT NO. : 5,941,365
DATED : August 24, 1999
INVENTOR(S) : Mark A. Ritter

It is certified that error appears in the above-identified patent and that said Letters Patent is hereby corrected as shown below:

Col. 5, line 12, delete the word "selector" before "switch."

Signed and Sealed this

Twenty-first Day of March, 2000

Attest:

Attesting Officer

Q. TODD DICKINSON

Commissioner of Patents and Trademarks